Feb. 27, 1940. T. K. WALMA Re. 21,376

SPACING MECHANISM

Original Filed Oct. 26, 1936

T. K. WALMA INVENTOR.

BY Merrill M. Blackburn.
ATTORNEY.

Reissued Feb. 27, 1940 Re. 21,376

UNITED STATES PATENT OFFICE 21,376

SPACING MECHANISM

Theodore K. Walma, Iowa City, Iowa

Original No. 2,098,816, dated November 9, 1937, Serial No. 107,664, October 26, 1936. Application for reissue June 17, 1939, Serial No. 279,691

12 Claims. (Cl. 146—153)

My present invention relates to mechanism for simultaneously moving a plurality of objects, at the same time maintaining a uniform spacing between said objects. This mechanism is illustrated as applied to the bread slicing art in which it is used for varying the distances between the slicing blades. It is not to be understood, however, that this is the only use to which this invention may be put. While applicant has chosen to illustrate this invention in connection with a particular type of machinery, he does not wish to be limited to that particular use.

Among the objects of this invention are to provide an apparatus for varying the spacing of given objects and maintaining the spacing thereof uniform during the change; to provide an improved apparatus by means of which the spacing of an entire group of objects may be varied or the spacing of a portion thereof may be left constant while the spacing of the remainder of the group is changed; to provide an apparatus of the character indicated which is light in weight and easily fabricated; and such further objects, advantages, and capabilities as will hereafter appear and as are inherent in the construction disclosed herein. My invention further resides in the combition, construction, and arrangement of parts illustrated in the accompanying drawing and, while I have shown therein what is now regarded as the preferred embodiment and some modifications thereof, I desire the same to be understood as illustrative only and not to be interpreted in a limiting sense.

In the drawing annexed hereto and forming a part hereof,

Figure 5:
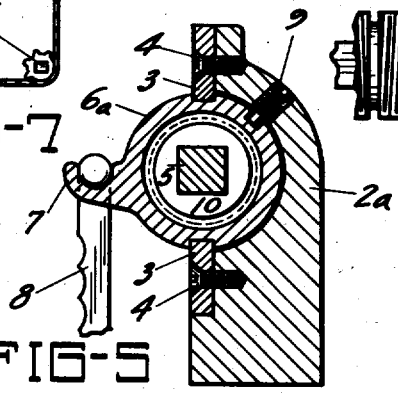
Fig. 5 represents a transverse section similar to Fig. 2 but illustrating a modified construction.

Reference will now be made in greater detail to the annexed drawing for a more complete disclosure of this invention. In this drawing, end supporting members are shown at 1 and a central supporting member at 2. In the form of construction shown in Figs. 1 to 3 and 5, these supporting members are connected by two or more bars 3 and 3a. The bars 3 are secured in place by means of screws 4 while the bar 3a is received in notches in the supporting members 1 and 2. Since the support 2 of Fig. 5 differs somewhat in form from the corresponding element of the other figures, it is designated by the numeral 2a.

Figure 1:
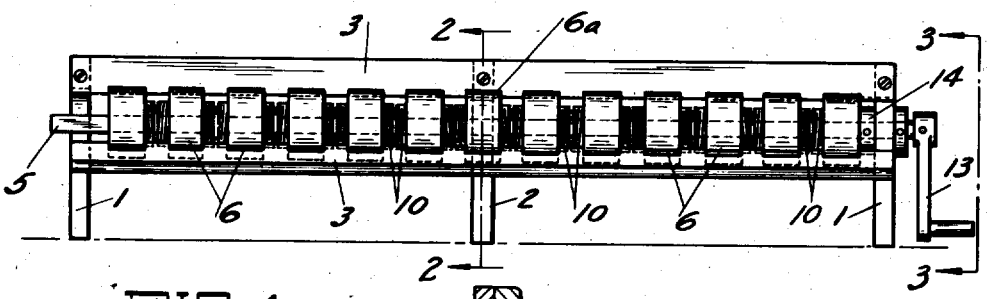
Fig. 1 represents a front elevation of a structure embodying my invention.

A rod or bar 5 of non-circular cross-section is supported in one of the end supports 1, as shown in Fig. 1, and has supported thereon a plurality of blocks 6 provided with any suitable attaching means for the connection of objects to be moved. In the present instance, hooks 7 are shown for the attachment of slicing blades 8. Of course each manufacturer of slicing machines has his own method of attaching his blades to the blade supporting frame and he will, consequently, adopt whatever form of attaching means seems to him best. I have shown merely one form of attaching means in order to illustrate an operative construction. In a bread slicing machine, each of the blocks 6 will have a suitable blade attaching means 7.

The central block 6a is shown as provided with an opening for the reception of a set screw 9 which prevents the block from moving relatively to its supporting frame. This block, like the blocks 6, is provided with notches or grooves in its peripheral surface for the reception of an edge portion of each of the bars 3 and 3a. These bars, therefore, prevent the rotation of the blocks with the shaft, rod, or bar 5, but permit them to move longitudinally thereof. This longitudinal movement is caused by externally screw-threaded sleeves 10, centrally apertured, with openings which fit closely the rod or bar 5. These sleeves 10 are provided at their opposite ends with right and left hand threading and the blocks 6 and 6a are correspondingly threaded so that the sleeves can be screwed into and out of the blocks to cause them to approach or separate from each other. Preferably, shallow grooves 11 are provided midway of the length of the sleeves 10 to separate the threading at the opposite ends of the sleeves. Similarly, grooves 12 are provided midway of the length of the blocks 6 to separate the opposite threading in the blocks.

Any suitable operating means, such as a crank 13 or a hand wheel, may be attached to the end of the rod or bar 5 by means of which it may be rotated. From the foregoing it will be seen that, when the actuating means 13 is turned in one direction, the sleeves 10 will be screwed out of the adjacent blocks and, when turned in the opposite direction, will be screwed into such blocks. Suitable stop means, as, 14, is provided for limiting the lengthwise movement of the blocks 6. This is for the purpose of preventing sleeves 10 and blocks 6 from becoming entirely separated during adjustment of the mechanism. Furthermore, the stop 14 may be omitted entirely, its function being served by an end frame member 1 so placed that longitudinal movement of the blocks 6 is arrested before separation occurs between these blocks and the sleeves 10.

It may be desirable, in the slicing of bread and possibly for other purposes, to have different spacings of the blocks 6 and the means connected to and actuated thereby, in the present instance shown as cutting blades. This can be accomplished by adjusting a section of the block 6 at the left hand end of the structure shown in Fig. 1 to the desired spacing and then withdrawing the rod 5 from as many of the sleeves 10 as necessary in order to leave the desired number of blocks at the left hand end undisturbed. The crank 13 can then be turned to adjust the remaining blocks to the desired spacing. Close spacing may be had at either end and wide spacing at the other or any other desired arrangement of spacing may be attained by proper manipulation.

Figure 6:
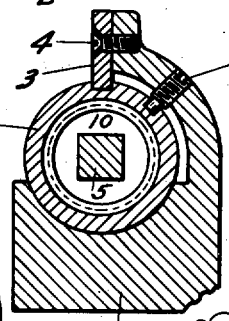
Fig. 6 represents a transverse section of a structure similar to Figs. 2 and 5 but showing a further modification.
Figure 2:
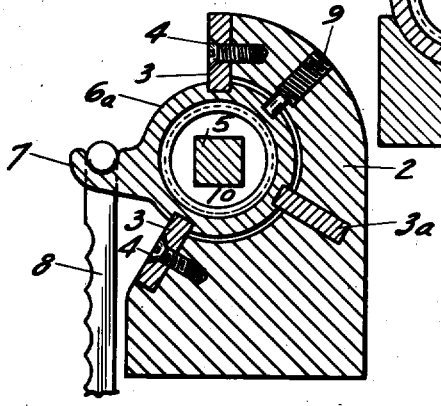
Fig. 2 represents a transverse section taken approximately along the plane indicated by the line 2—2, Fig. 1.
Figure 3:
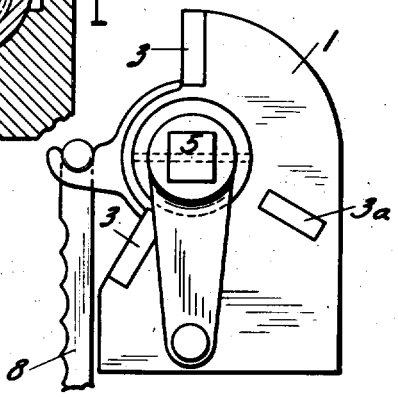
Fig. 3 represents an end elevation of a structure taken in the direction of the arrows 3—3, Fig. 1.
Figure 4:
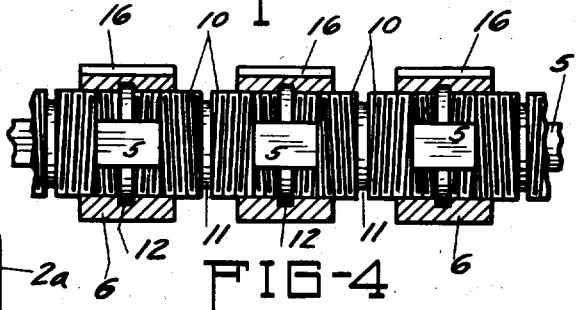
Fig. 4 represents a longitudinal sectional elevation of a fragmentary part of this construction.

Fig. 6 is intended to represent a construction in which the blocks 6 and 6*a* rest in a trough formed in a member 15. This takes the place of the two lower guide strips 3 and 3*a* of Fig. 2, making it possible to get along with a single guide strip 3, shown at the top of Fig. 6. The guide notches of the blocks 6 are indicated by the numeral 16 at the top of Fig. 4. It will be appreciated that when this construction is used in a slicing machine, such as a bread slicer, it will be necessary to have one of these structures at the upper end and one at the lower end of each set of blades. The one at the lower end will preferably be substantially the same as the one at the upper end but inverted. The trough arrangement of Fig. 6 is not desirable for a bread slicing machine for the reason that crumbs will collect in the trough and cause clogging of the mechanism. For this reason, the structures of Figs. 1, 2, 3, and 5 are preferable for use in bread slicing machines, since there is very little surface upon which crumbs may collect.

Figure 7:
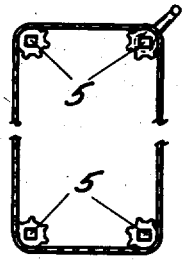
Fig. 7 represents the actuating means whereby the ends of the blades of a slicing machine may be adjusted.

When this construction is used as a means for adjusting bread slicing machine blades, it will be necessary to simultaneously adjust both ends of the blades and this will be accomplished by suitable connections between the upper and lower bars 5. Such connections are already known in the art. However, I have illustrated in Fig. 7 a mechanism by means of which this adjustment may be effected. This comprises a series of sprocket wheels mounted on the ends of the rods or bars 5 and having a sprocket chain passed thereover and connecting the wheels. Thus it will be seen that when the actuating means 13 is turned all four shafts will be rotated at the same speed and the blades will be simultaneously adjusted at the same rate.

It will of course be understood that the specific description of structure set forth above may be departed from without departing from the spirit of this invention as set forth in this specification and the appended claims.

Having now described my invention, I claim:

1. A mechanical movement comprising supporting means, a straight rod of non-circular cross-section supported thereby, sleeves surrounding said rod and slidable longitudinally thereof, said sleeves having their internal surfaces conforming substantially to the rod and fitting the same closely but sufficiently loosely to be freely slidable thereon, the external surfaces of the sleeves being threaded in opposite directions from opposite ends, longitudinally apertured blocks having their apertures threaded in opposite directions from opposite ends, the threads of the blocks cooperating with the threads of the sleeves to cause motion of both longitudinally of the rod when the latter is rotated, and guiding means for the blocks to support them and prevent their rotation around the rod.

2. A structure as defined by claim 1 in which a block located approximately midway of the rod is held stationary whereby to cause the blocks upon opposite sides of the stationary block to move simultaneously in opposite directions.

3. A structure as defined by claim 1 in which the rod is partly or wholly removable from the sleeves and may be rotated when partly removed to adjust the spacing of part of the blocks.

4. Blade holding and adjusting means for a slicing machine comprising a bar of non-circular cross-section and a support therefor, movable supporting blocks provided with blade-holding means and surrounding said bar, right and left hand screw-threaded means operatively connecting said blocks to each other and to the bar, said screw-threaded means having substantially axial openings fitting closely said bar, and, upon rotation of the bar, causing the blocks to approach toward or recede from each other so as to maintain an equal spacing of the blocks and of the blades carried thereby.

5. A structure as defined by claim 4 in which the blocks have grooves in their peripheral surfaces, extending longitudinally thereof, in combination with a bar carried by the support and extending through the grooves to keep the blocks from rotating with relation to each other.

6. A structure as defined by claim 4 in which the blocks have attaching means projecting from one side thereof, said structure being provided with means for preventing rotation of the blocks.

7. A slicing machine blade holding and adjusting mechanism comprising a supporting framework, a bar extending longitudinally thereof, a series of blade-holding blocks supported by said bar, said blocks having means to which blades may be attached, guiding means connected with said blocks for preventing rotation thereof, and right and left hand screw-threaded means connecting said blocks to each other and to said bar, said screw-threaded means being rotatable with the bar to cause the blocks to approach or recede from each other.

8. A structure as defined by claim 7 in which the guiding means comprises a pair of bars supported upon opposite sides of the blocks and which extend longitudinally thereof through notches cut in the exterior longitudinal surfaces of the blocks.

9. A structure as defined by claim 7 in which the guiding means comprises a plurality of bars extending in a direction substantially parallel to the first mentioned bar, the blocks having longitudinal notches in their peripheral surfaces for the reception of the plurality of bars, the bars fitting in said notches and the blocks being slidable along the bars.

10. A structure as defined by claim 7 in which the supporting framework comprises, in part, a trough-shaped member, against the concave surface of which the blocks are held.

11. In a mechanical movement, a supporting framework, a series of movable blocks supported thereby and movable therealong, screw-threaded means to actuate the blocks longitudinally of the framework, said screw-threaded means comprising alternate sections of right and left hand threading, said blocks being internally screw-threaded to cooperate with the right and left hand threading of the screw-threaded means whereby to draw the blocks toward each other or cause them to separate, depending upon the direction of rotation of the screw-threaded means, and means for rotating the screw-threaded means to cause variations in the spacing of the blocks.

12. A slicing machine blade adjusting mechanism, comprising a framework, a bar non-circular in cross-section extending longitudinally thereof, a series of blade guiding blocks supported by said bar, said blocks having means for receiving and guiding slicing blades, guiding means cooperating with said blocks to prevent rotation thereof, and a plurality of screw-threaded means, freely longitudinally slidable on said bar, and interengaging with said bar whereby said screw-threaded means are constrained to rotate with said bar, at least one of said screw-threaded means being interposed between each adjacent pair of blocks, at least one of each adjacent pair of blocks being in screw-threaded engagement with the screw-threaded means interposed therebetween, said screw-threaded means cooperating with said blocks upon rotation of the bar in one direction to cause all adjacent blocks of said series to recede from each other.

THEODORE K. WALMA.